United States Patent
Anderson et al.

(10) Patent No.: US 9,278,494 B2
(45) Date of Patent: Mar. 8, 2016

(54) APPARATUS FOR CASTING A NON-PNEUMATIC TIRE HAVING A FLOATING MOLD ALIGNMENT MECHANISM

(75) Inventors: Scott Powell Anderson, Greenville, SC (US); Brian D Wilson, Greer, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/380,119

(22) PCT Filed: Feb. 28, 2012

(86) PCT No.: PCT/US2012/026944
§ 371 (c)(1),
(2), (4) Date: Aug. 21, 2014

(87) PCT Pub. No.: WO2013/130047
PCT Pub. Date: Sep. 6, 2013

(65) Prior Publication Data
US 2015/0017277 A1    Jan. 15, 2015

(51) Int. Cl.
B29C 33/30 (2006.01)
B29D 30/02 (2006.01)
B29C 41/04 (2006.01)
B29C 41/38 (2006.01)
B29D 30/06 (2006.01)

(52) U.S. Cl.
CPC .............. *B29D 30/02* (2013.01); *B29C 41/042* (2013.01); *B29C 41/38* (2013.01); *B29D 30/0605* (2013.01); *B29C 33/303* (2013.01); *B29D 30/0601* (2013.01)

(58) Field of Classification Search
CPC .. B29C 33/303; B29D 30/02; B29D 30/0601; B29D 30/0606; B29D 30/0679; B29D 30/0605
See application file for complete search history.

(56) References Cited

U.S. PATENT DOCUMENTS

| 4,124,345 A |   | 11/1978 | Grunner et al. |
| 4,669,964 A | * | 6/1987 | Amano et al. ............... 425/34.1 |
| 4,698,002 A | * | 10/1987 | Grotkasten .................. 425/28.1 |
| 4,909,972 A | * | 3/1990 | Britz ............................... 425/47 |
| 5,127,811 A |   | 7/1992 | Trethowan |
| 5,906,836 A | * | 5/1999 | Panaroni et al. ................ 425/47 |
| 2011/0240193 A1 |   | 10/2011 | Matsuda et al. |

FOREIGN PATENT DOCUMENTS

CA     1293602 C     12/1991

OTHER PUBLICATIONS

International Search Report with Written Opinion dated Jun. 7, 2012.

* cited by examiner

*Primary Examiner* — James Mackey
(74) *Attorney, Agent, or Firm* — John Steckler Schwab

(57) ABSTRACT

This invention relates generally to an apparatus for rotationally casting a portion of a tire, and, more specifically, to an apparatus that has a floating alignment mechanism that allows a portion of a mold to move in the radial direction of the tire, which is at least partially formed by the mold, allowing the molding apparatus to omit the use of tie bars. The mechanism may comprise two set of needle roller bearings that are orthogonally arranged to allow radial movement of a portion of a mold.

17 Claims, 8 Drawing Sheets

APPARATUS FOR CASTING A NON-PNEUMATIC TIRE HAVING A FLOATING MOLD ALIGNMENT MECHANISM

BACKGROUND OF THE INVENTION

1. Field of the Invention

This invention relates generally to an apparatus for rotationally casting a portion of a tire, and, more specifically, to an apparatus that has a floating alignment mechanism that allows a portion of a mold to move in the radial direction of the tire, which it at least partially forms, allowing the molding apparatus to omit the use of tie bars.

2. Description of the Related Art

An emerging field in tire development involves the manufacture and use of non-pneumatic or hybrid tires that do not depend solely on gas to support the tire structurally as these tires are not prone to deflation, which can render standard pneumatic tires inoperable. An example of such a tire is disclosed by U.S. Pat. No. 7,201,194, which is commonly owned by the applicant of the present application. The content of this patent is incorporated herein by reference for all purposes in its entirety. In an exemplary embodiment of the '194 patent, the non-pneumatic tire includes an outer annular shear band and as plurality of web spokes that extend transversely across and radially inward from the annular shear band and are anchored in a wheel or hub. In certain embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, invention of U.S. Pat. No. 7,201,194 also provides advantages that include a more uniform ground contact pressure throughout the length of the contact area. Hence, this tire mimics the performance of a pneumatic tire.

FIG. 1 shows such a tire that defines a radial direction R. For reference, all the reference numerals in the 100's used herein refer to the tire features while all reference numerals in the 200's used herein refer to a molding apparatus for making such a tire and reference numerals in the 300's used herein refer to a features of a floating mold alignment mechanism according to an embodiment of the present invention. The tire 100 comprises a tread 102 that is attached to the outward extent 104 of the spokes 106, which in turn, are connected to a hub or wheel 108 at their inward extent 110 by means known in the art such as by molding spokes between the hub 108 and the tread 102, which have been prepared for suitable bonding to the polyurethane. An outer annular band 105 is located between the outward extent of the spokes and the tread and an inner annular band 107 is found at the inward extent of the spokes, connecting them together. This inner annular band 107 can be used to attach the tire to a hub or wheel.

For the version of the tire 100 shown, the annular bands 105, 107 and spokes 106 are formed by pouring a polyurethane liquid into a rotational mold where the liquid is spread via centrifugation and then cured or hardened. It can also be seen that the spokes 106 are grouped in pairs and that the individual spokes 106', 106" within each pair are consistently spaced from each other and that each pair is spaced consistently from the adjacent pair around the circumference of the tire. The spacing within each pair and the spacing between each adjacent pair do not need to be the same. As described by the Abstract and col. 2, lines 28-41 of the '494 patent, the spokes 106 support the tire 100 in tension near the top of the tire 100 and not in compression. Instead, the spokes 106 at the bottom of the tire near the contact patch, which is where the tread 102 of the tire 100 contacts the road, compress or buckle easily. This helps the tire to simulate the pneumatic support function of a pneumatic tire.

Due to the sensitive and important function that the annular bands 105, 107 serve, i.e. to create the bond between the tread and the hub or wheel, as well as aesthetic concerns, it is desirable that the thickness of the bands remain constant. Looking at FIG. 2, mold cores 238" found on a bottom mold half 234 are shown that form the spokes and inside surfaces 101 of the annular bands. These mold cores are drafted on the surfaces 237 that form the spokes themselves as mold cores coming from one side of the mold interarticulate with similarly configured mold cores coming from the other half (as better described later) so that the thickness of the spokes can remain constant even if there is draft present. However, these mold cores are undrafted on the surfaces 235 that form the inside surfaces of the annular bands. In the case of the inside surface of the outer annular band 105, the inside surface of the tread is substantially cylindrical, requiring that the inside surface of the outer annular band also be cylindrical to maintain the thickness of the annular band and to avoid aesthetic inconsistencies on the outer annular band from one side of the tire to the other. A similar situation exists for the inside annular band.

The depth of the mold cores is equal to or greater than 150 mm, which is a deeper draw than is typical. This added to the fact there are surfaces lacking draft means that the spokes are proned to stick often when demolding. This can cause distortion of the spokes and annular bands and/or undesirable and non-uniform appearance. Any misalignment of the mold halves in the radial direction further exacerbates this problem. Therefore, this problem could be helped if a high degree of mold alignment were present to make sure that movement of mold halves and their associated mold cores was purely translational as mold opening and demolding occurred. This could be facilitated by the use of traditional tie bars that connect the mold platens and guide their movement. However, the molding press and associated platens are designed to open rotationally, about the vertical and horizontal axes, as well as translate for opening and closing the mold. This wide range of movement in addition to the desire to have free access to the interior of the mold for accessing its components as well as a tire being made therein make the use of such tie bars impractical. In addition, the lack of tie bars means that mold platens and mold halves may be misaligned, which during demolding, can cause distortion of the spokes of the tire.

Consequently, damage to the tine often occurs. Accordingly, it is desirable to find an apparatus that allows such tires to be manufactured using mold cores with surfaces that are undrafted using some sort of alignment mechanism. It would be particularly useful if such an apparatus could be designed without the use of tie bars. Finally, providing means allowing adjustment or movement of a mold half in the radial direction of the tire would be helpful.

SUMMARY OF THE INVENTION

Particular embodiments of the present include an apparatus for molding a tire a radial direction that includes a molding press and a mold. The molding press may have first and second platens that are operatively associated with the press for changing their position relative to each other for opening and closing a mold that is attached to the platens. The mold may have first and second portions that are attached to the first and second platens of the molding press respectively. The apparatus may further include a floating mold alignment mechanism that is operatively associated with the first portion of the mold, the first platen and the molding press, said mechanism including at least one sliding member that allows tie first portion of the mold to freely move in said radial direction a predetermined amount.

In certain cases, the motor may drive the second portion of the mold and the cap and outer ring of the first portion of the mold may be coupled to the second portion of the mold when the mold is closed, causing the first portion of the mold to rotate.

In other embodiments, the first mold portion is a mold half.

Sometimes, the first portion of the mold is fixedly attached to the first platen and said press has a frame and said mold alignment mechanism is slidably attached to the frame and is also slidably attached to the first platen.

In certain embodiments, the mold alignment mechanism comprises a first slide and a second slide that are operatively associated with the first platen, first mold portion and molding press, said slides being arranged for orthogonal movement relative to each other.

In still other embodiments, the mold alignment mechanism further comprises a set of needle bearings that guide the movement of one slide and another set of needle bearings that guide the movement of the other slide. In such a case, the first and second slides may be similarly configured with v-shaped protrusions on two lateral sides. The mold alignment mechanism may further comprise four v-shaped races with sets of needle bearings found on opposing sides of the races that mate with the v-shaped protrusions of the slide, two of said v-shaped races mating with each of the slides, providing four sets of needle bearings for guiding each slide. The apparatus may further comprise two gibs for each slide the guiding the movement of each slide wherein the gibs have v-shaped grooves for retaining the v-shaped protrusions of the slides.

The predetermined amount of radial movement may be at least 0.5 mm and could range from 1 to 2.5 mm.

In particular applications, the molding press may be a vertical molding press and the first platen may be an upper platen and the second platen is a lower platen. The upper platen may include an opening that serves as a pouring slot when the mold is closed. The upper platen may be pivotally connected to the molding press and the lower platen may be translatably connected to the molding press in a vertical direction.

In other applications, the apparatus may further include a freeplay adjusting mechanism that limits the movement of the floating mold alignment mechanism in at least one direction. This freeplay adjusting mechanism may comprise an attachment member having an aperture and a stud. The stud may have threaded ends and a flange, one of the threaded ends may be configured to mate with a threaded hole found on the slide. The stud may be further configured so that the flange is found adjacent the slide and the attachment member, which is to say between them, after the stud has been secured to the slide and passed through the aperture of the attachment member. This mechanism may further comprise a nut that attached to the free threaded end of the stud that extends past the attachment member.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 3:
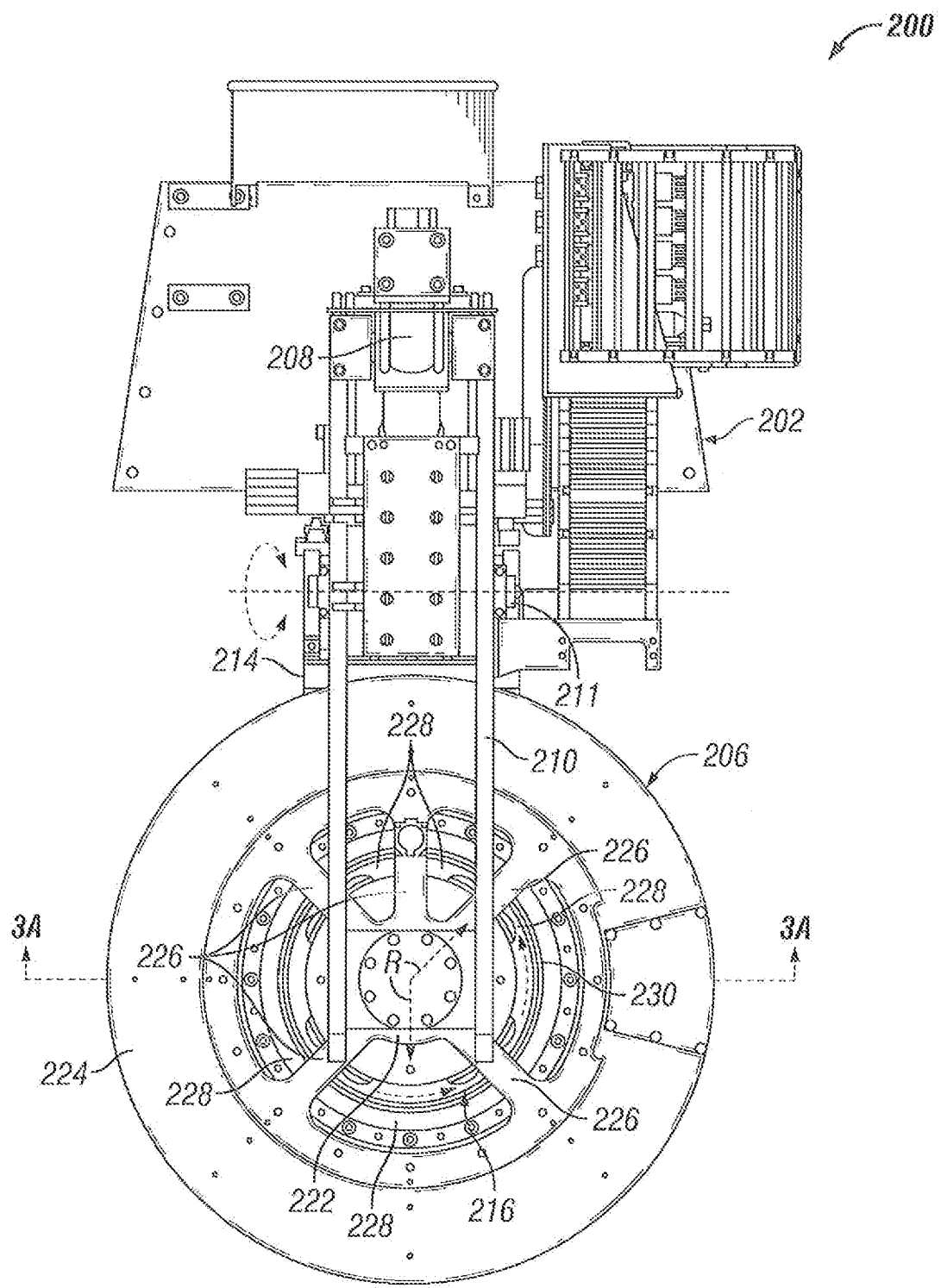
FIG. 3 is a top view of a molding apparatus according to a first embodiment of the present invention.
Figure 3A:
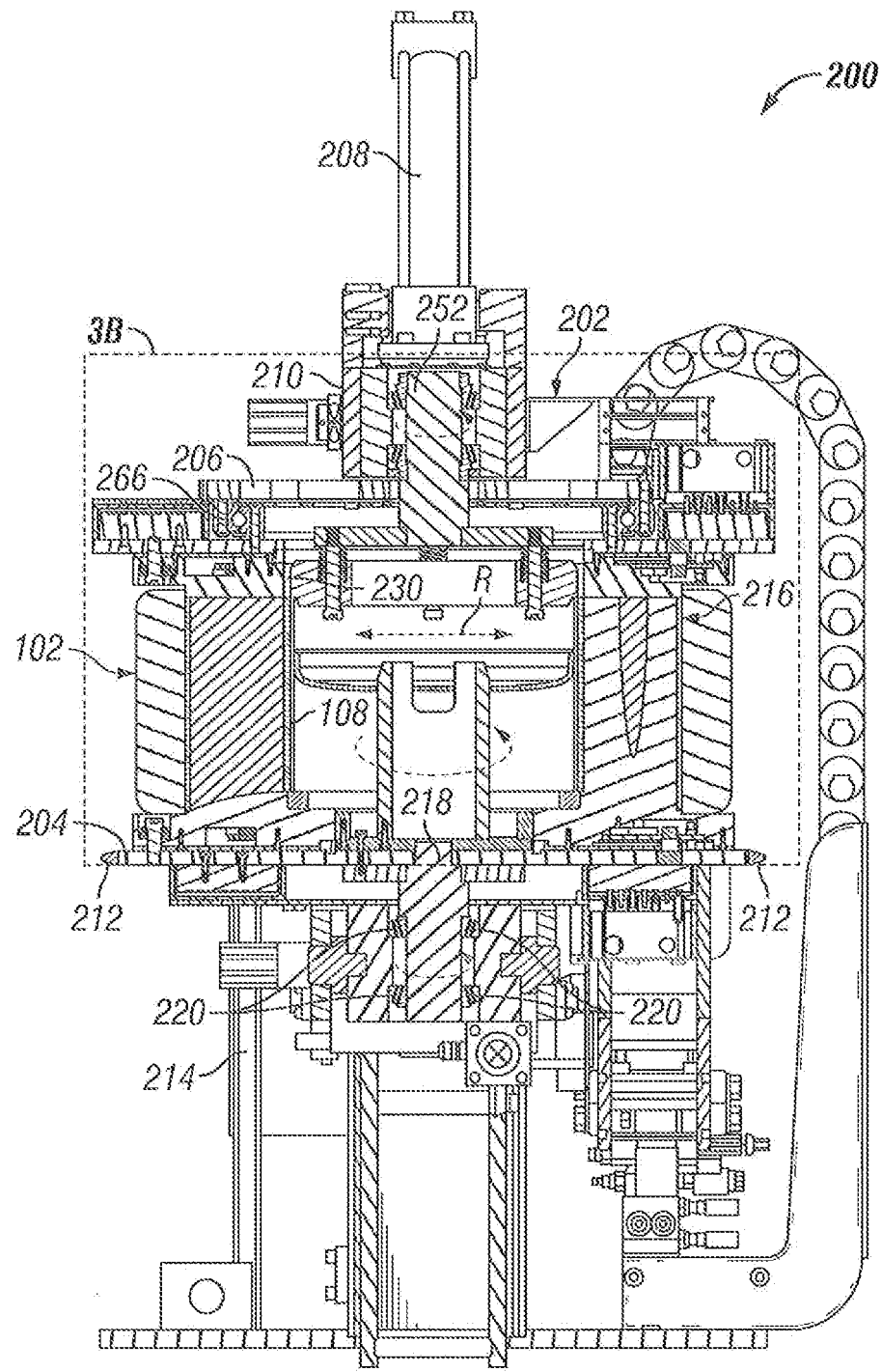
FIG. 3A is sectional view of the molding apparatus of FIG. 3 taken along lines 3A-3A thereof.
Figure 3B:
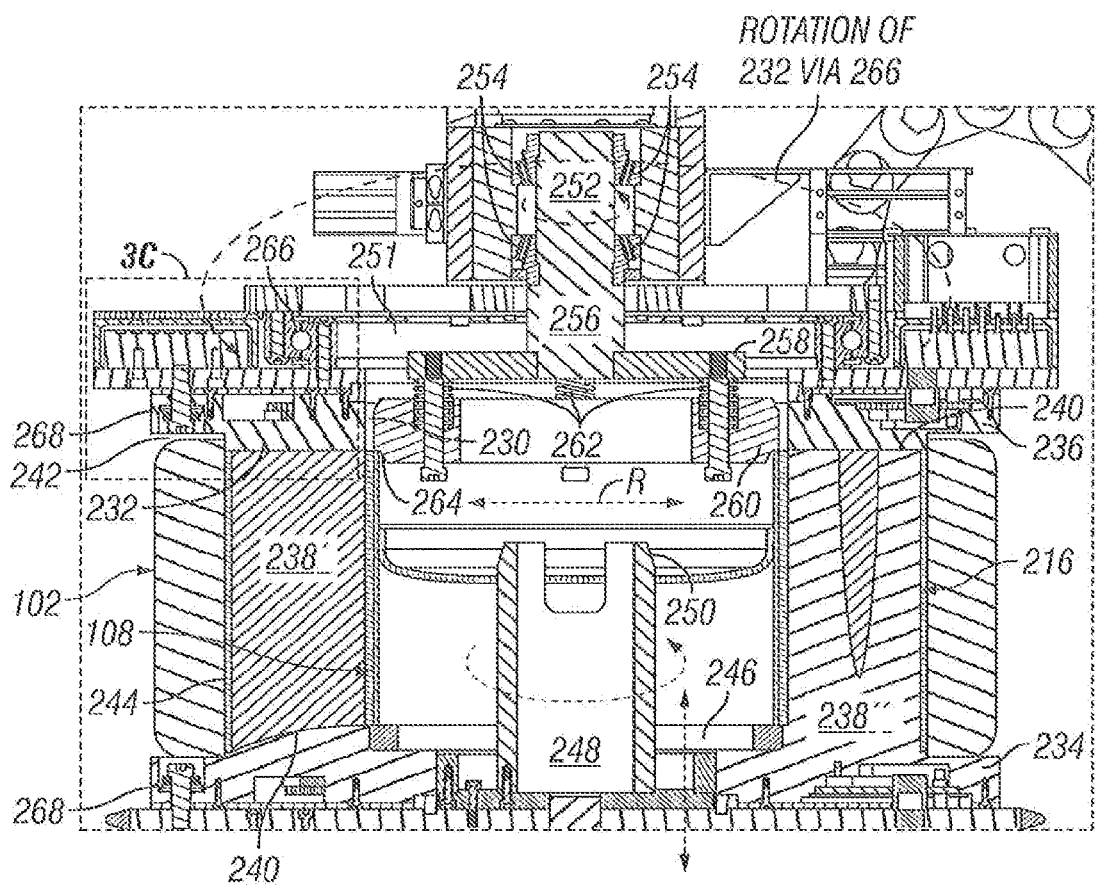
FIG. 3B is are enlarged of the mold and top portion of the molding apparatus of FIG. 3A.
Figure 3C:
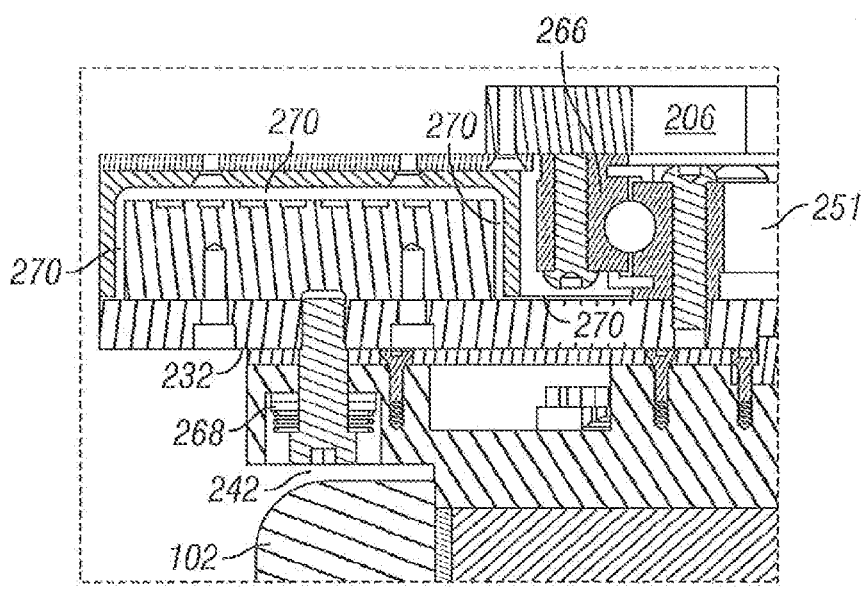
FIG. 3C is an enlarged view taken from FIG. 3B to more clearly show the gap found between the upper platen of the molding press and outer ring assembly of the top portion of the mold.

Looking at FIGS. 3 thru 3C, an apparatus 200 for molding a portion of a tire 100 in a manner consistent with one embodiment of the present invention is depicted. Specifically as best seen in FIGS. 3 and 3A, this apparatus 200 includes a vertical molding press 202 comprising a lower platen 204, upper platen 206, hydraulic cylinder 208, arm 210, a gear 212 and frame 214. The frame 214 is fixed and the lower platen 204 is translatably fixed in a horizontal plane but is free to translate vertically while the upper platen 206 is pivotally connected to the frame 214 via pin 211. The upper platen 206 is moved by the hydraulic cylinder 208 in and out of a parallel alignment with the lower platen 204. Both platens can also rotate about a horizontal axis as previously described. The gear 212 mates with a drive pinion (not shown) powered by a motor (not shown) that can engage and disengage the gear 212 when it is appropriate to rotate the lower platen 204 and mold 216, which is affixed thereto, to form the spokes 106 as will be explained later.

It is contemplated that the upper platen 206 could translatably connected to the frame 214 and could be moved by means other than hydraulic, such as pneumatic, mechanical or other means commonly known hi the art. Likewise, the rotation of the lower platen 204 could be achieved by way of other means known in the art such as by an electric motor that is directly coupled to the shaft 218 to which the lower platen 204 is attached. The translation of the lower platen can be achieved using the same methods mentioned previously for moving the upper platen 206. Roller bearings 220 are also provided to guide the rotation of the lower platen 204 and to minimize the friction associated with its rotation. A floating mold alignment (not shown in FIGS. 3 thru 3C) mechanism attaches the top platen to the arm of the mold flame but it is contemplated that this alignment mechanism could be interposed between the upper mold half 236 and the upper mold platen 206. Details of this alignment mechanism are further described later.

The top view provided by FIG. 3 depicts how the upper platen 206 is attached to the frame 214 using the arm 210 in an effective manner requiring as little material as possible. The upper platen 206 has a generally thin cylindrical shape that is split into a central portion 222 and an outer annular portion 224. The arm 210 of the molding press 202 extends horizontally from the frame 214 and down a small distance vertically to connect to the central portion 222 of the top platen 206. Five slender connecting members 226, arranged in as circular array, extend from the central portion 222 and connect to the outer annular portion 224. The inner and outer portions 222, 224 of the top platen 206 are configured concentrically with five openings 228 found between them and the connecting members, one of which is above the pouring slot 230.

It is contemplated that the construction of the top platen and its attachment to the frame of the molding press could be achieved in other. For example, separate arms could be used to connect the inner and outer portions of the top platen to the frame of the molding press. Also, the openings found on top surface of the upper platen could be replaced by a single aperture that extends through the side surface of the mold platen or through a side surface of the mold far enough to reach the pouring slot.

Figure 1:
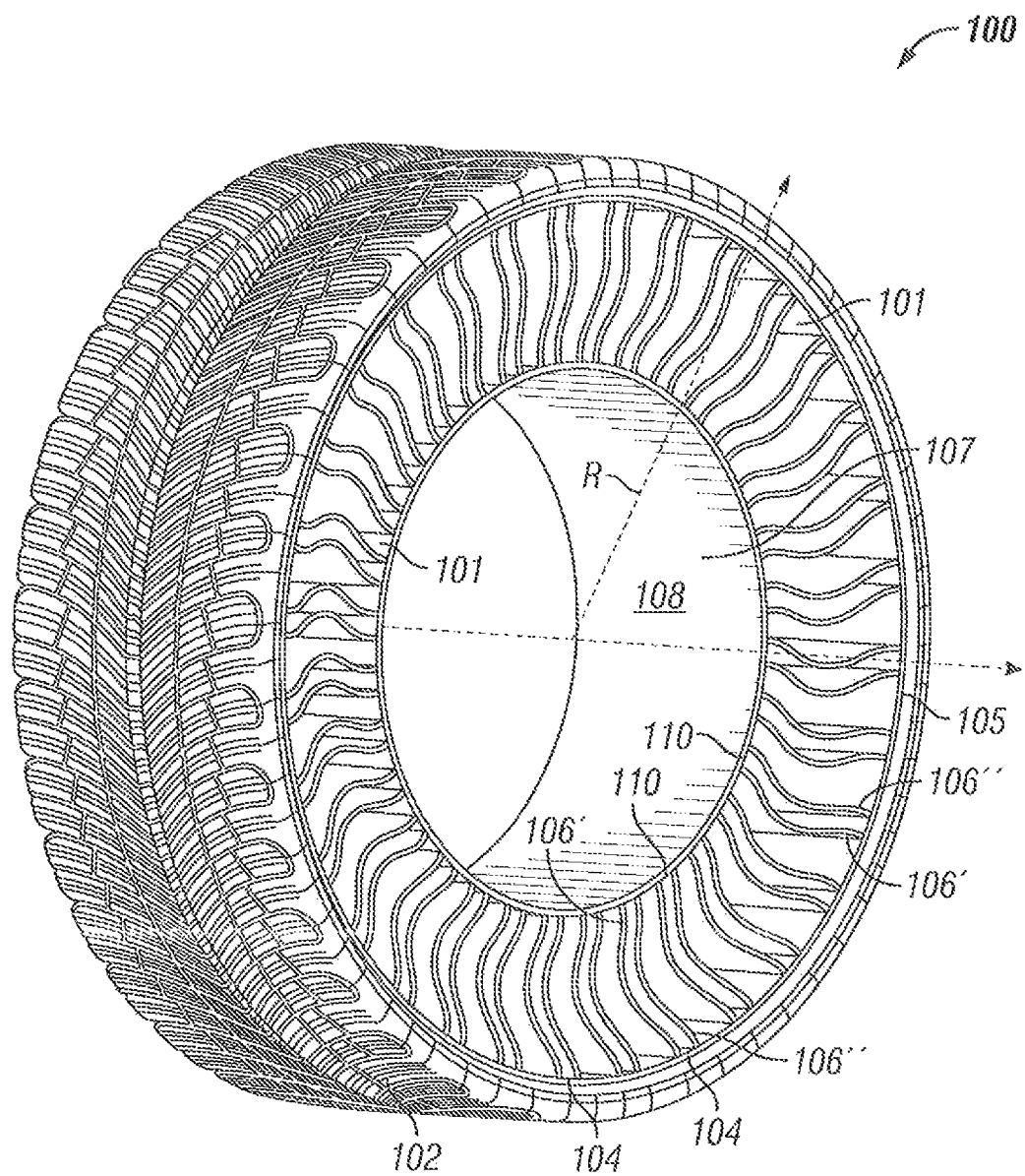
FIG. 1 is a perspective view of a non-pneumatic tire that has spokes that can be molded using an apparatus according to an embodiment of the present invention.
Figure 2:
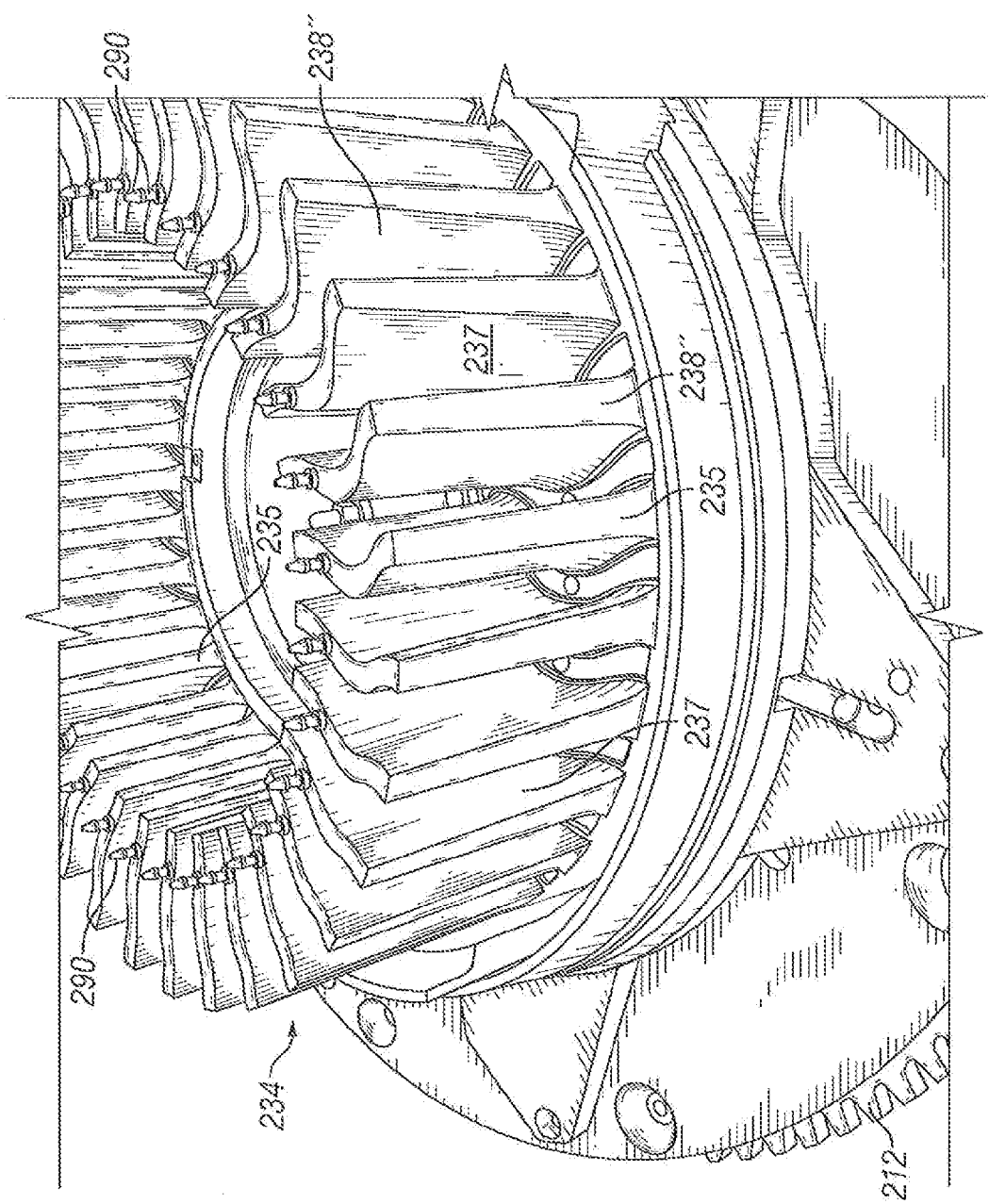
FIG. 2 is a perspective view of a mold half and associated cores that form the spokes of the tire of FIG. 1.

Focusing now on the details of the mold 216 as shown by FIGS. 3A and 3B, it can be seen that the mold 216 includes a lower portion 234 and an upper portion 236 that each have cores 238 that interarticulate to define the cavities that form the spokes 106 as the cores extend from one side of the mold to the other in an alternating fashion around the circumference of the mold. Diametrically opposing cores are shown with core 238' on the left side of the figure extending from the top portion 236 of the mold 216 and core 238" on the right side of the figure extending from the bottom portion 234 of the mold 212. The cores 238 shut off on slightly contoured surfaces 240, but it is contemplated that they could extend into the opposing mold half in a telescoping manner. Other common mold features such as vents here as they are not important to the present invention, but are often used. The cores are shown as solid extensions of the mold halves, but they could be separate inserts for ease of replacement should one of them be damaged. Mold alignment features in the form of taper pins 239 are shown in FIG. 2.

The tread 102 of the tire 100 is placed in an annular groove 242 found along the circumferential surface of the mold 216 after the mold is opened by pivoting the upper platen 206 up and away from the lower platen 204 and the lower platen is translated downward to a middle position. A slight interference (not clearly shown) is provided near the bottom of the annular groove 242 between the tread 102 and cores 238 so that as a robotic arm places a tread into the mold, it can press the tread onto the core causing a small press fit locally, which tends to keep the tread 102 seated during the molding process. A clearance groove 244 is also provided along the outside surfaces of the cores 238 in order to allow the flow of polyurethane along the inside surface of the tread 102, facilitating the bonding of the spokes 106 to the tread 102 and forming the outer annular band 105 as previously described. At about the same time as the tread 102 is positioned into the bottom portion 234 of the mold 216, the hub 108 is situated in a pocket 246 found in the center of the mold 216 by a robotic arm or other means commonly known in the art and is guided into place by a sleeve 248 having a lead-in surface 250.

The upper mold portion 236 comprises a rotating cap assembly 252 that is rotatably attached to the mold press 202 and is guided by roller bearings 254. The roller bearings 254 used in this case are model numbers 42687/42620 sold by SIMPLY BEARINGS LTD. (SKF). Of course, other rotatable attachments are feasible such as a journal hearing or magnetic bearing depending on the application provided they allow this assembly to rotate freely. A gap 251 is provided between the press 202 and this assembly 252 to limit the amount of friction created as the assembly rotates. This rotating cap assembly 252 includes a shaft 256 that is guided by the bearings and that has a flange 258 attached to its bottom end. A cap 260 is connected below the flange 258 by at least one, and sometimes four, bolt and compression spring subassemblies 262. The cap 260 has a chamfer 264 located on its bottom edge for properly aligning the cap 260 to the hub 108 as the upper platen of the molding, press pivots downward into a parallel alignment with the lower platen and the lower platen translates upward to its top position where the mold is closed. Now, the chamfered portion of the cap 260 extends down past the topmost part of the hub 108 and into its interior as shown by FIG. 3B.

In addition, the upper portion 236 of the mold 216 includes an outer ring assembly 232 that is rotatably attached to the upper platen 206 of the molding press 202 using a large diameter stewing bearing 266 that is found outside of the pouring slot 230 in a radial direction R of the mold (consistent with the coordinate axes of a tire that is contained within the mold). Other rotatable attachments can be used in lieu of the slewing bearing such as a journal bearing or magnetic bearing depending on the application provided that they reduce the amount of resistance to rotation, i.e. friction, a suitable amount. Also, materials such as bronze or plastic may be used to create a rotating attachment where these materials that have a low coefficient of friction slide against one another. For this embodiment, a slewing bearing sold by SCHAEFFLER TECHNOLOGIES GmbH & Co. KG-(INA) under model no. VSU 200544 is used.

As best seen in FIG. 3C, there is a small gap 270 found between the majority of the upper platen 206 of the molding press 202 and the outer ring assembly 232, which provides clearance as the outer ring asssembly 232 rotates on the stewing bearing 266. However, this gap 270 severely limits the amount of heat that can be transferred from the mold 216 to the upper platen 206 of the press 202. This leads to temperature drift of the outer ring assembly 232, which is made of aluminum and steel that have different coefficients of thermal expansion. This means that portions of the outer ring assembly can grow different amounts. Hence, conventional bolted joints for holding these different portions of the outer ring assembly are impractical as bolts tightened when the mold is in a cold state may snap as the mold heats up.

Accordingly, compression springs 268 or alternatively disk springs are provided between the head of the bolt and the bottom surface of the counterbore in which the head of the boil is found, allowing the spring to absorb the effects of thermal expansion and to prevent snapping of the bolt. A similar technique is used to attach the lower portion 234 of the mold 216 to the lower platen 204 for the same reason.

Again, it is desired that the rotation of the bottom portion 234 of the mold 216 be conveyed to the outer ring assembly 232 by some sort of coupling between the outer ring assembly 232 and the bottom portion 234 of the mold 216. Otherwise, the cores of the outer ring assembly 232 may crash into the cores of the lower portion 234 of the mold 216 and/or the thickness of the spokes will not be consistent. This coupling may be accomplished through friction or through structural interlocking features such as cores that telescope from one mold half into the opposing mold half and/or mold alignment features such as taper pins 290 (best seen in FIG. 2). It should be noted that the rotatable attachments of the outer ring assembly 232 and the cap assembly 252 of the upper mold half are separate from each other so each assembly is free to rotate independently of the other assembly.

Turning back to FIG. 3, when the mold 216 is closed and rotating, a nozzle (not shown) can be positioned above the opening 228 of the top platen 206 and pouring slot 230 of the mold 216 for introducing a liquid such as polyurethane into the mold 216. As can be seen from the above cited structure, the rotatable and concentric attachment of the cap 260 and outer ring assembly 232 to the molding press 202 along with the small gap provided between the cap and outer ring, which acts as a pouring slot 230, allows these components to rotate and spread a liquid such as polyurethane to form the spokes of the tire without interrupting the fill of the mold by some structural feature that is also rotating. This avoids the waste of polyurethane as it is diverted from entering the mold and also helps all the spokes to be formed consistently and uniformly without the formation of bubbles that are introduced into the polyurethane by the turbulence caused by the rotation of a structural component that interrupts the flow of the polyurethane into the mold.

Once a tire 100 has spokes bonded to the hub 108 and tread 102 in the mold 216, the lower platen 204 may be translated downward to a bottom position where pins (not shown), which are attached to the floor below the lower platen of the press, may pass through holes in the lower platen and in the lower portion 234 of the mold 216 and push on the bottom of the tread 102, causing the tire to rise and demold from the cores that extend from the bottom portion of the mold. Alternatively, an ejection system could be actuated that pushes the tire out of the mold without moving the lower platen past its middle vertical position mentioned earlier where the tread is placed into the mold. At about this time, the upper platen 206 is rotated out of the way, creating enough space for the robotic arm to pick up the tire. The process for adding the spokes to another tire can now begin if desired.

As described previously, it is during this demolding process when damage to the polyurethane portion can happen due to improper mold alignment. Therefore, the inventors of the present invention have devised a new and useful floating alignment mechanism 300 that allows the top mold portion to float in the radial direction of the mold/tire, helping to prevent any distortion of the spokes and outer and inner annular rings.

Figure 4:
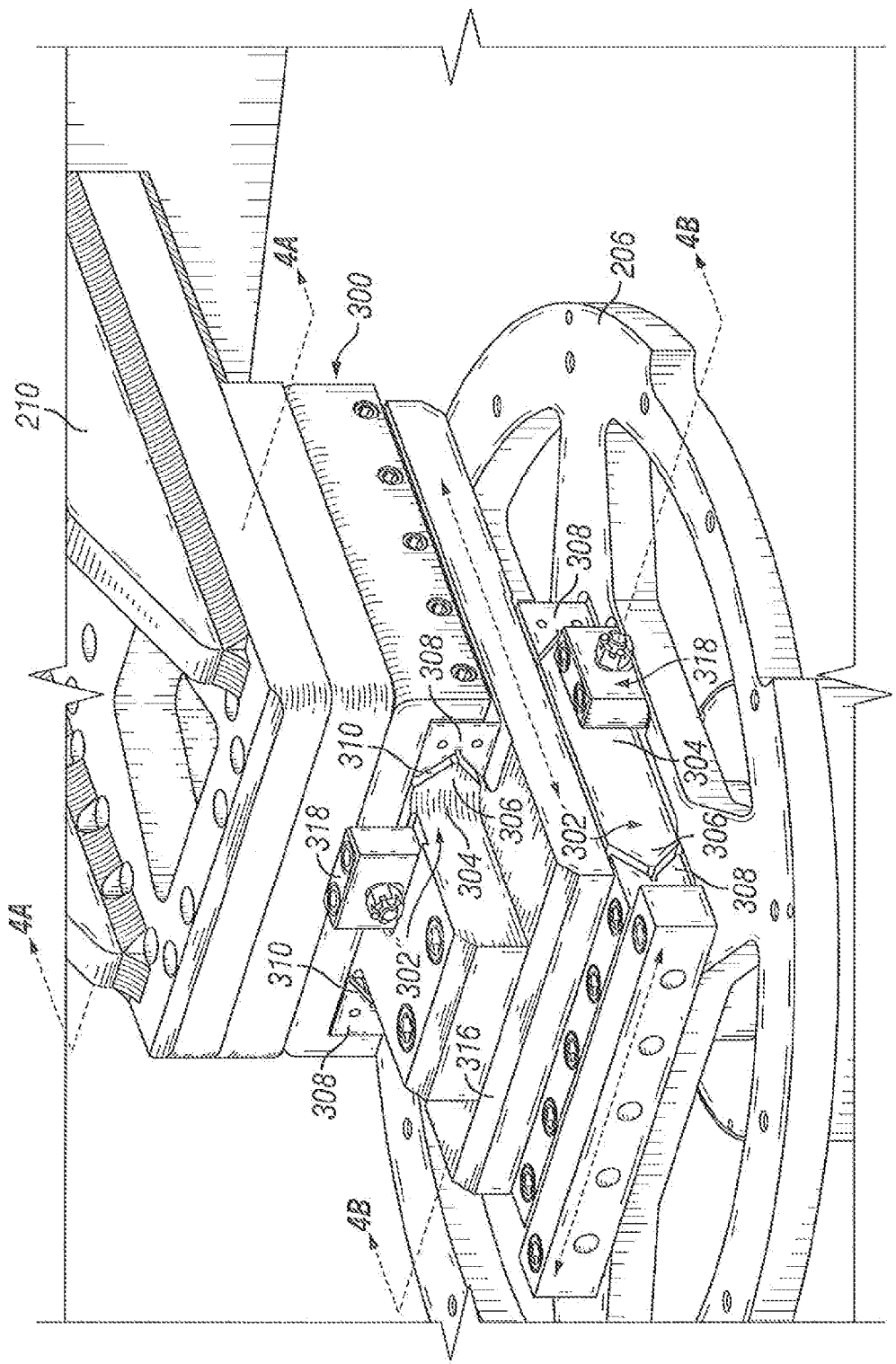
FIG. 4 is a perspective view of a floating mold alignment mechanism attached to a top platen and arm of a molding press according to an embodiment of the present invention with a portion of the top mold half removed for enhanced clarity.

Focusing now on FIG. 4, a perspective view of a floating mold alignment mechanism 300 according to one embodiment of the present invention can be clearly seen that can be used with molding apparatus just described. It comprises two sliding assemblies 302', 302" that are connected to each other and that are able to slide in directions that are orthogonal to one another. For this embodiment, the bottom assembly 302' is slidably attached to the upper platen 206 and is able to slide in a direction that is perpendicular to the direction that the arm 210 of the frame of the mold press extends. Proximate to the top of the bottom assembly 302' is the top assembly 302" that is slidably attached to the arm 210 and able to slide in a direction that is parallel to the direction that the arm extends. Since these assemblies are able to slide in different orthogonal directions, the whole upper platen 206 and upper mold half 236 can move in both directions simultaneously, allowing the upper mold half to float in the radial direction of the tire, effectively compensating for any mold misalignment by allowing natural free movement in any radial direction that is needed.

Figure 4A:
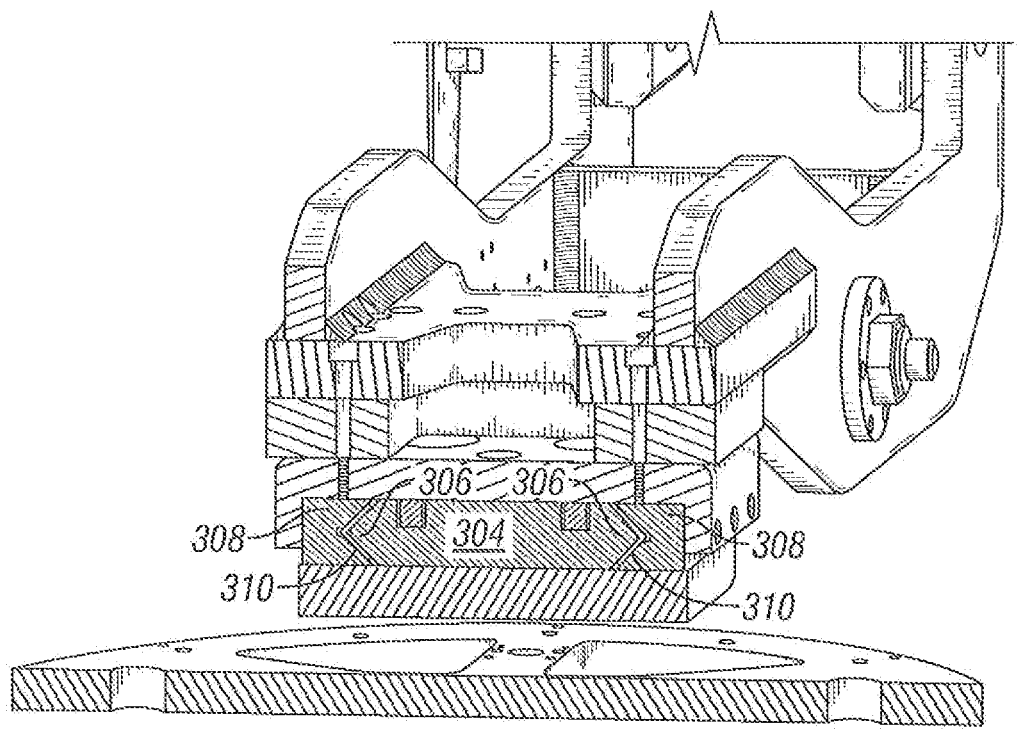
FIG. 4A is a sectional view of the mold alignment mechanism of FIG. 4 taken along line 4A-4A thereof with only the top assembly shown for enhanced clarity with the races being exposed to see how they are trapped between the gibs and slide.

Both assemblies are similarly constructed and comprise a slide 304 with two protruding v-shaped portions 306, two v-shaped guides or gibs 308, v-shaped races 310 and needle roller bearings 312. The v-shaped portions 306 of the slide 304 are complimentarily configured to mate with the grooves found on the gibs 308 and the v-shaped races 310 fit snugly between the v-shaped portions of the slide and the grooves of the gibs. Trapped between the races and the slides are a plurality of needle roller bearings 312 that are seated within depressions 314 found on the races as best seen in FIG. 6. For this embodiment, needle roller bearings sold by SKF under model no. LWHW 15×358 are used. Sets of roller bearings are found on the top and bottom of each race meaning that four sets, two on each side of the slide, guide each slide as it translates (as best send in FIG. 4A). The gibs 308' for the bottom assembly 302' are bolted to the upper platen 206 mid aligned thereto using dowel pins or other means commonly known in the art.

Attached to the top of the slide 304' of the bottom assembly is a cap plate 316 that is attached thereto using bolts and dowel pins, or by other means commonly known in the art. Another slide 304", which is part of the top assembly, is bolted and dowel pinned to the cap plate 316 and it is arranged perpendicularly to the slide of the bottom assembly in order to provide orthogonal movement thereto as previously described. The slide of the top assembly is in turn slidably attached to the arm 210 of the molding press via gibs 308" that are attached to the arm using bolts and dowel pins in like manner as has been described. It is possible that the slide of the bottom assembly, the cap plate and the slide of the top assembly can be bolted and doweled together using a single set of bolts and dowel pins.

Figure 4B:
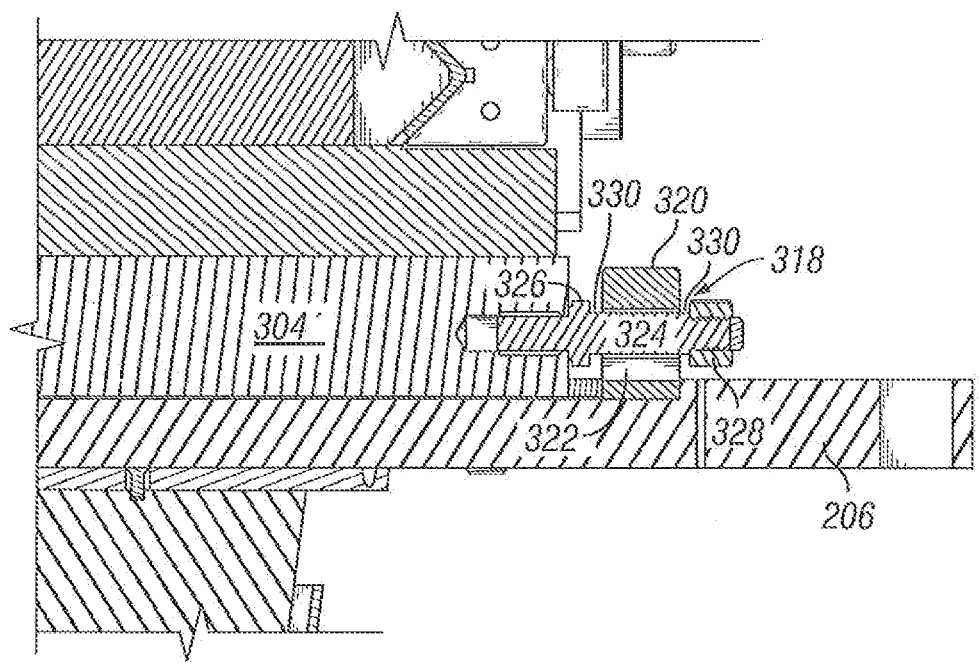
FIG. 4B is an enlarged sectional view of the mold alignment mechanism of FIG. 4A with the bottom assembly of the mold alignment mechanism shown and a freeplay adjuster assembly shown in cross section, depicting how the adjuster assembly works using an attachment member, double ended threaded stud with flange, and a nut.
Figure 5:
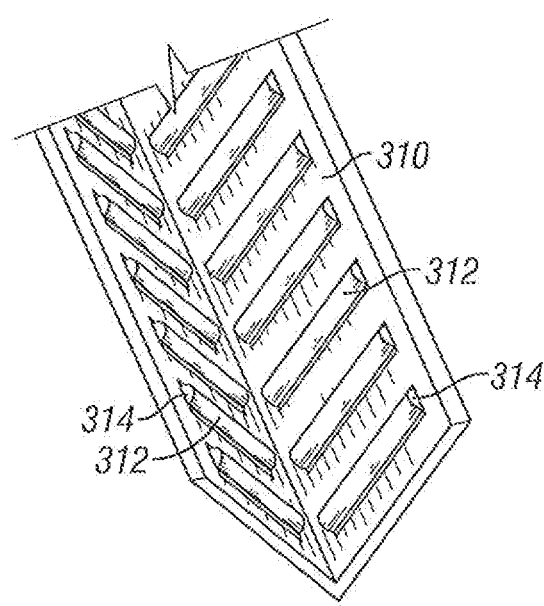
FIG. 5 has a perspective view of the race and needle roller bearings seated in the depressions thereof on opposing faces of the race.

As can be imagined, these sliding joints could allow the upper mold platen, floating mold alignment mechanism and mold press to become dissociated from each other, which could lead to damaging of the equipment. Also, there is a significant amount of movement which these joints allow and too much movement could lead to the cores of one side of the mold crashing onto the other side of the mold, which could also lead to damage. Consequently, freeplay adjuster or stop assemblies 318 are provided that limit the movement of the slides, preventing any damage to the equipment that could result from over travel. As best seen in FIG. 4B, this assembly includes an attachment member 320 with an aperture 322, such as a slot for casing assembly, which can be bolted to the upper platen 206 for use with the bottom assembly. A stud 324 with threads on each end and a flange 326 can be screwed into the side of the slide 304' with the flange being positioned between the slide and the attachment member. The free end of the stud that extends through the slot and past the attachment member can have a nut 328 tightened thereon and all these parts can be configured and positioned so that gaps 330 are located between the flange and attachment member on one side and between the nut and attachment member on the other side.

In operation, the slide is free to move toward the attachment member until the flange hits the member, stopping any further movement in this direction. The slide is also free to move away from the attachment member until the nut hits the member, stopping any further movement in that direction. This travel to and fro can be adjusted by decreasing the thickness of the flange or nut or by adding washers into the gap. For this embodiment, the gaps range from 1.0 to 1.5 mm, meaning that the relative movement in any one direction ranges approximately the same.

It should be noted that a similarly configured system is used conjunction with the top assembly where the attachment member is bolted to the top of the slide of the upper assembly and the stud is attached to the arm of the mold frame. It provides similar movement for the top assembly as is provided for the bottom assembly. For this embodiment, it preferable that the amount of movement allowed by the floating alignment mechanism be at least 0.5 mm in any radial direction in order to compensate for typical mold misalignment but this could be varied depending on the nature and design of the equipment such as the mold and molding press as well as the depth of draw necessary to manufacture the desired tire. Furthermore, the inventors have found experimentally that it is desirable to limit the amount of strain on a polyurethane spoke to 5% or less. Since most spokes of the tire contemplated herein have a thickness that is approximately 10 mm, this translates into a desired radial play of 0.5 mm.

It is contemplated that other types of mechanism could be used instead of needle roller bearings including more traditional roller bearings, ball bearings and sliding frictional bearings. Also, mechanisms working on magnetic, hydrodynamic and hydrostatic principles could also be employed. Virtually any mechanism that allows sufficient radial movement can be used with the present invention. Therefore, the description of the particulars of the mechanism using roller bearings should not be interpreted as limiting the present invention. For example, the inventors contemplate that mechanisms similar to bearings that allow components to float and move relative to each other such as hydrodynamic, hydrostatic and magnetic bearings could be employed. Specifically, a sliding member in the form of a round plate that is free to glide on ball bearings and that is seated in a circular pocket that is oversized a sufficient amount to allow the desired radial movement could be used. Similar sliding members may float using magnets or by providing a thin fluid that is pressurized to reduce friction and allow free movement in the radial direction. Additionally, the translating member could be seated in flexible material such as rubber, gel or other material at allows some freeplay in the radial direction of the mold/tire. In any embodiment, the mechanism needs to be able to float freely even under a heavy load such as hundreds of pounds.

While only a tread that is formed with spokes that is part of a non-pnuematic tire has been specifically described herein, it is contemplated that this process could be used with tires that use a gas along with spokes (often referred to as a hybrid tire) to support the load applied to the tire. The tire does not need to be configured with a shear layer or have other properties or features as the tire contained in U.S. Pat. No. 7,201,194. Also, other materials may be used instead of polyurethane such as any thermosetting material that is suitably durable and strong to support the loads applied to the tire. Furthermore, the embodiments discussed herein focused on adding spokes to the tire but the present invention is also applicable to forming other regions of a tire.

Only one such mold alignment mechanism has been shown and described for use with a complete mold, but is contemplated that multiple mechanisms that are operatively associated with each core that could become stuck to portions of the tire could be employed. In other words, multiple mold alignment mechanisms could be used for multiple mold portions. It is further contemplated that a floating mold alignment mechanism could be accomplished by separating the orthogonal translation of the sliding members such that one sliding member would be operatively associate with a first half of the mold and the other sliding member would be operatively associated with the second half of the mold.

While this invention has been described with reference to particular embodiments thereof, it shall be understood that such description is by way of illustration and not by way of limitation. For example, a vertical molding press has been described but it is contemplated that a horizontal molding press could also be used provided that biasing means are provided with the alignment mechanism to account for gravity. For example, spring means could be included in the freeplay adjuster assemblies to bias the mechanism to a centered position. This spring means could also be used in a vertical molding press application to help prevent mold crash during mold closing. In like fashion, the mold has been described as having a cylindrical shape, but it could have other shapes such Os a square or rectangular cube. Also, this invention has allowed the elimination of tie bars but it is contemplated that it could be used with presses that have tie bars too.

In general, many details of the molding apparatus including mold and press details have been described herein in order to provide context for the present invention but are not essential to the practice of the present invention although they may be combined with the present invention, which is primarily concerned with the use of the floating mold alignment mechanism. Furthermore, for convenience this mechanism was attached to the top platen of a vertical molding press but it is contemplated that it could be operatively associated with any platen of a press regardless of the configuration or orientation of the press. As such, the floating mechanism can be located in host of places including between a platen and a mold or between a platen and the frame of a press. Finally, different aspects and features of some of the embodiments discussed herein may be substituted for other features of other embodiments to yield further embodiments. Accordingly, the scope and content of the invention are to be defined only by the terms of the appended claims.

What is claimed is:

1. An apparatus for molding a portion of a tire having a radial direction that includes a molding press and a mold, said apparatus further comprising:
    first and second platens, said platens being operatively associated with said press for changing their position relative to each other for opening and closing said mold that is attached to said platens;
    a first portion of the mold that is attached to the first platen of the molding press and a second portion of the mold that is attached to the second platen of the molding press; and
    a floating mold alignment mechanism that is operatively associated with the first portion of the mold, the first platen and the molding press, said mechanism includes at least one sliding member that allows the first portion of the mold to freely translate in said radial direction a predetermined amount.

2. The apparatus of claim 1, wherein said first portion of the mold is a mold half.

3. The apparatus of claim 1, wherein said first portion of the mold is fixedly attached to the first platen and said press has a frame and said mold alignment mechanism is slidably attached to the frame and is also slidably attached to the first platen.

4. The apparatus of claim 1, wherein said mold alignment mechanism comprises a first slide and a second slide that are operatively associated with the first platen, the first mold portion and the molding press, said slides being arranged for orthogonal movement relative to each other.

5. The apparatus of claim 4, wherein said mold alignment mechanism further comprises a first set of needle bearing linear guides that guide the movement of the first slide and a second set of needle bearing linear guides that guide the movement of the second slide.

6. The apparatus of claim 5, wherein said first set of needle bearing linear guides and said second set of needle bearing linear guides each comprises a v-shaped protrusion on each of two lateral sides of each slide, said mold alignment mechanism further comprising of a first set and a second set of v-shaped races, each v-shaped race comprising a set of needle bearings found on opposing sides of said each said v-shaped race, each said v-shaped race mating with one of said v-shaped protrusions of said first and second slides, providing four sets of needle bearings for guiding said first slide and four sets of needle bearings for guiding said second slide.

7. The apparatus of claim 6, further comprising two gibs for each slide for guiding the movement of each slide wherein the gibs have v-shaped grooves for retaining the v-shaped races and v-shaped protrusions of the slides.

8. The apparatus of claim 1, wherein the predetermined amount of radial movement is at least 0.5 mm.

9. The apparatus of claim 8, wherein the predetermined amount of radial movement is 1.0 mm-2.5 mm.

10. The apparatus of claim 3, wherein said molding press is a vertical molding press, said first platen is an upper platen, said second platen is a lower platen and wherein said upper platen includes an opening that serves as a pouring slot when the mold is closed.

11. The apparatus of claim 10, wherein said upper platen is pivotally connected to the molding press and said lower platen is translatably connected to the molding press in a vertical direction.

12. The apparatus of claim 10, wherein said molding press further comprises an arm that extends from the frame and wherein said upper platen includes a central portion and an outer annular portion and the central portion is connected to the arm, said apparatus further comprising a connecting member that connects the outer annular portion to the central portion of the upper platen.

13. The apparatus of claim 1, further comprising a freeplay adjusting mechanism that limits the movement of the floating mold alignment mechanism in at least one direction.

14. The apparatus of claim 13, wherein said freeplay adjusting mechanism comprises an attachment member having an aperture and a stud, said stud passing through said aperture, said stud secured to said first portion of the mold, said attachment member secured to a portion of the apparatus that is not the first portion of the mold.

15. The apparatus of claim 14, wherein said stud has threaded ends and a flange, one of said threaded ends being configured to be attached to a slide, said slide secured to a portion of the apparatus that is not part of the first portion of the mold, said stud being configured so that the flange is found adjacent the slide and the attachment member after said stud has been secured to the slide and passed through the aperture of the attachment member, said freeplay adjusting mechanism further comprising a nut that is attached to a free end of the stud that extends past the attachment member.

16. The apparatus of claim 13, wherein said freeplay adjusting mechanism comprises an attachment member having an aperture and a stud, said stud passing through said aperture, said attachment member secured to said first portion of the mold, said stud secured to a portion of the apparatus that is not the first portion of the mold.

17. The apparatus of claim 16, wherein said stud has threaded ends and a flange, one of said threaded ends being configured to be attached to said portion of the apparatus that is not the first portion of the mold, said stud being configured so that the flange is found adjacent to the attachment member after said stud has been secured to said slide and passed through the aperture of the attachment member, said freeplay adjusting mechanism further comprising a nut that is attached to the free threaded end of the stud that extends past the attachment member.

* * * * *